J. R. HARE.
COMB.
APPLICATION FILED JAN. 27, 1917.
1,255,601. Patented Feb. 5, 1918.
Fig. 1.
Fig. 2.
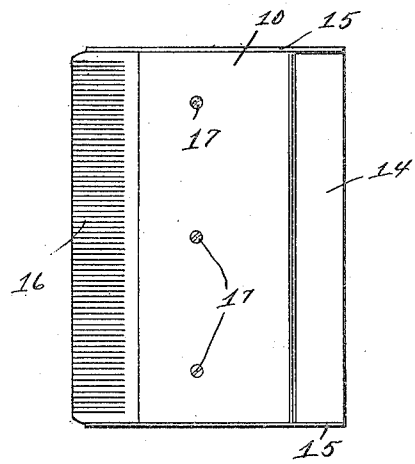
Fig. 5.
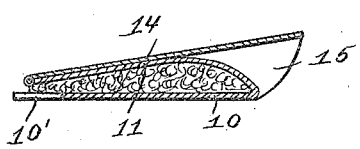
Fig. 3.
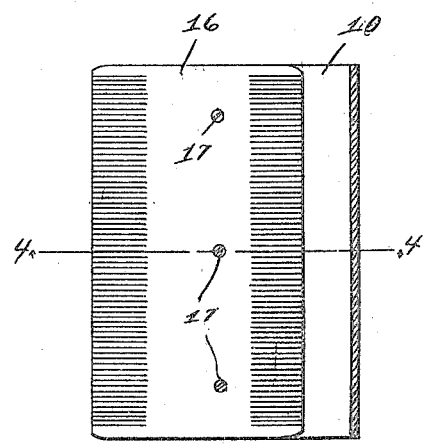
Fig. 4.
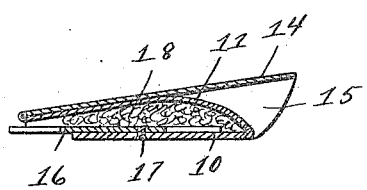
WITNESSES
Arthur K. Moore
Ross J. Woodward
INVENTOR
John R. Hare
BY Richard Bowen,
ATTORNEY

UNITED STATES PATENT OFFICE.

JOHN R. HARE, OF NEW WINDSOR, MARYLAND.

COMB.

1,255,601. Specification of Letters Patent. Patented Feb. 5, 1918.

Application filed January 27, 1917. Serial No. 144,939.

*To all whom it may concern:*

Be it known that I, JOHN R. HARE, a subject of the King of Great Britain, residing at New Windsor, in the county of Carroll and State of Maryland, have invented certain new and useful Improvements in Combs, of which the following is a specification.

This invention relates to an improved comb and the principal object of the invention is to provide a comb which will be used principally for removing fleas and other insects from animals such as dogs and which will have an improved body construction forming a housing in which the insects will be received and held when removed from the animal.

Another object of the invention is to so construct this body that the comb may either be formed integral with the body or separate therefrom.

Another object of the invention is to so construct the body of this comb that ready access may be had to the housing formed therein to permit removal of the insects and to further permit a substance such as cotton to be placed in the housing so that when the fleas enter the housing they will cling to the cotton.

This invention is illustrated in the accompanying drawings, wherein:—

Figure 1 is a view showing the improved comb in top plan,

Fig. 2 is a view showing the improved comb in bottom plan.

Fig. 3 is a longitudinal sectional view through the comb.

Fig. 4 is a transverse sectional view through the comb taken along the line 4—4 of Fig. 3.

Fig. 5 is a view similar to Fig. 4 showing a modified construction with the comb formed integral with the body.

The body is formed from a strip of sheet metal in the form shown, the sheet being bent to provide a lower wall 10, and an upper wall 11 which extends beyond the lower wall and terminates in hinge ears 12 through which a pivot pin may be passed to extend through the hinge ears 13 and pivotally mount the handle or leaf 14 which extends as shown clearly in Fig. 4 and is provided with side flanges 15 forming side walls for the housing or chamber within the body. It will thus be seen that when this leaf is in the position shown in Fig. 4, the housing will be closed excepting at its open forward end and that when the leaf is raised, easy access may be had to the housing. It has been stated that the body and leaf will be formed of sheet metal preferably resilient but it is of course understood that the body and leaf could be formed of molded composition or any other suitable material. The comb 16 is positioned in the housing and may be secured in place by fasteners such as the screws 17 so that the comb may be removed and a new one put in place when desired. If so desired, the comb could be formed integral with the lower wall 10 of the body by extending the lower wall to the proper point as shown in Fig. 5 and providing teeth 10′ which would correspond to the teeth of the comb 16.

When this comb is in use, raw cotton or other fibrous material 18 will be placed in the housing of the body and the device will be held with the side flanges closing the ends of the housing within the body. The teeth of the comb will be passed through the animal's hair and fleas and other insects will be removed. These insects will pass into the housing and will be held therein until a sufficient number have been gathered. The device will then be placed in a suitable receptacle and hot water poured into the receptacle thus killing the gathered insects. A new piece of cotton can then be put in place and use of the device continued until all of the insects have been removed from the animal. If desired, the teeth of the comb could engage the forward end of the upper wall 11 thus closing the forward end of the receptacle or housing within the body, the teeth of the comb being moved away from the upper wall when in use by pressure upon the free end portion of the leaf 14 and rear portion of the lower wall 10. If this construction is provided, the device could be used either with or without the cotton 18.

What is claimed is:—

1. A device of the character described comprising a body having an upper wall and a lower wall, a leaf hingedly connected with the upper wall and provided with side flanges extending to the lower wall when the leaf is swung to rest upon the upper wall, and engaging teeth positioned beneath the free end portion of the upper wall.

2. A device of the character comprising a body having an upper wall and a lower wall terminating short of the free end of the upper wall, gathering teeth positioned beneath the free end portion of the upper wall, and a leaf carried by the upper wall and provided with depending side flanges extending to the lower wall of the body.

3. A device of the character described comprising a housing including upper and lower walls, a gatherer extending from the lower wall, and a closure for the ends of said housing pivotally connected with the housing.

4. A device of the character described comprising a body formed from a strip of resilient material bent to provide an upper wall and lower wall having free edge portions, gathering means extending from the lower wall, and a plate carried by the upper wall and provided with depending side flanges forming closures for the housing.

In testimony whereof I affix my signature in presence of two witnesses.

JOHN R. HARE.

Witnesses:
TRUMAN E. LAMBERT,
DAVID PICKETT.

Copies of this patent may be obtained for five cents each, by addressing the "Commissioner of Patents, Washington, D. C."